United States Patent [19]
Sanders

[11] 3,929,555
[45] Dec. 30, 1975

[54] CONVEYOR BELT STRIPPER

[76] Inventor: Lloyd E. Sanders, 2680 Braithwood Road, NE., Atlanta, Ga. 30345

[22] Filed: Jan. 7, 1974

[21] Appl. No.: 431,050

[52] U.S. Cl. ................: ............ 156/584; 242/85; 254/148; 254/166
[51] Int. Cl.² ......................................... B66D 1/00
[58] Field of Search ........... 156/344, 584; 29/200 R, 29/223, 244, 239, 248; 254/1, 139, 166, 135, 167, 178; 242/158.4, 158, 86.5; 24/263 A, 263 PJ, 263 SB

[56] References Cited
UNITED STATES PATENTS

| | | | |
|---|---|---|---|
| 801,102 | 10/1905 | Quay | 24/263 A |
| 1,459,693 | 6/1923 | Rand et al. | 156/344 |
| 2,477,064 | 7/1949 | Kuert | 254/166 |
| 2,985,430 | 5/1961 | Greenwood | 254/139 |
| 3,456,899 | 7/1969 | Smith et al. | 242/158 R |
| 3,687,385 | 8/1972 | Skalleberg | 242/158.4 |
| R14,994 | 11/1920 | Blaylock | 156/584 |

*Primary Examiner*—Douglas J. Drummond
*Assistant Examiner*—F. Frisenda, Jr.
*Attorney, Agent, or Firm*—Jones, Thomas & Askew

[57] ABSTRACT

A method and apparatus for stripping a layer of material from a conveyor belt is disclosed wherein a layer of material at the end of a belt is cut into strips, and the strips are mechanically pulled away from the other layers of the belt. A winch is mounted on a portable framework, and a clamp for clamping the end of the belt is movable between an operative position beside the winch and a storage position above the winch. The winch is movable with respect to the clamp so that it can be aligned with each strip of the layer of material being stripped from the belt.

4 Claims, 4 Drawing Figures

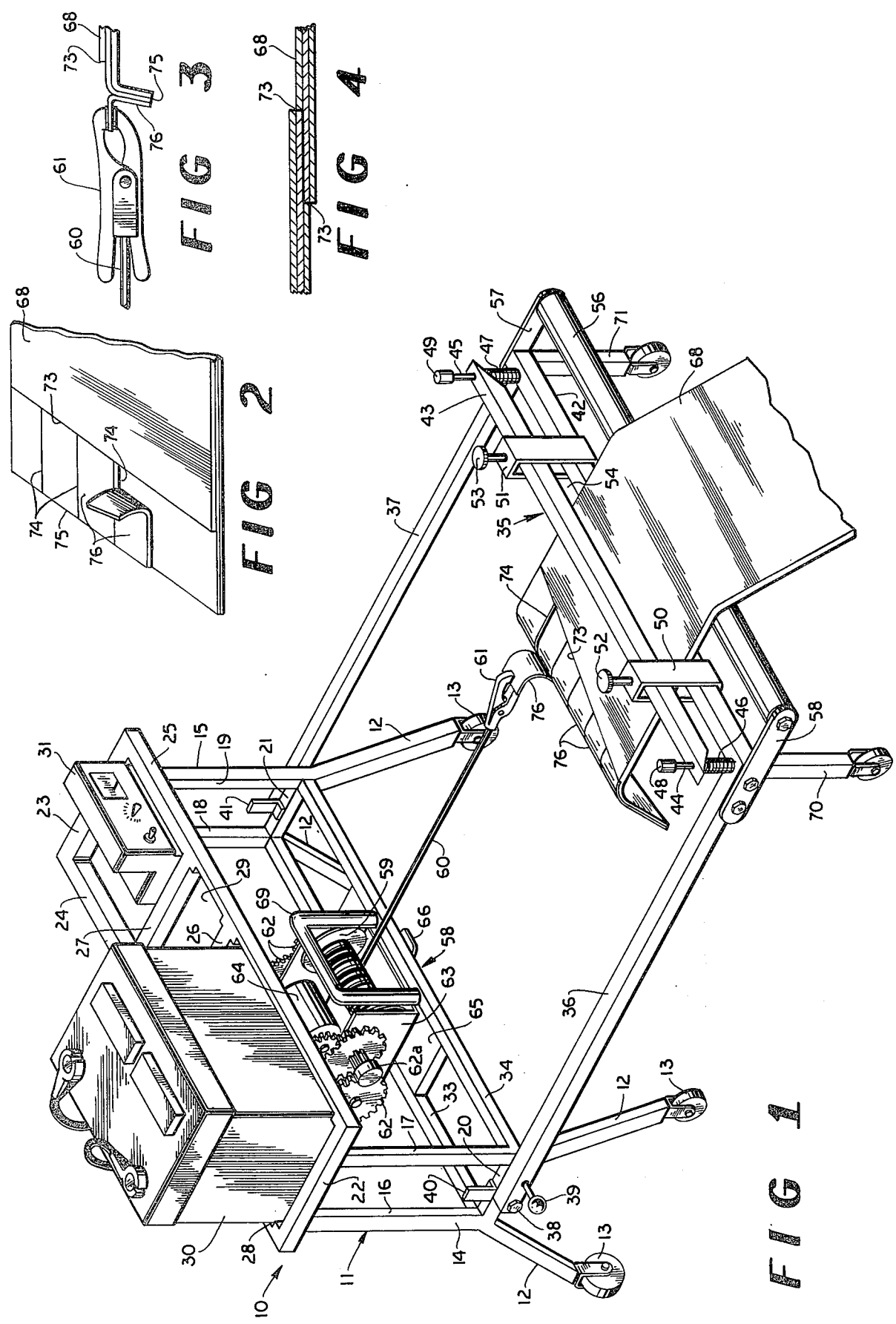

3,929,555

CONVEYOR BELT STRIPPER

BACKGROUND OF THE INVENTION

When an endless conveyor belt is to be formed, the ends of a length of belt material are joined together. The belt material usually is formed with several plies of material, with at least one inner ply being fabricated with cords extending along the length of the belt for preventing excessive stretching of the belt when in use. Usually, it is desirable to create a relatively smooth strong connection at the ends of the length of belt material so the finished endless conveyor belt operates reliably on its guide rollers without undue vibration. One method of joining the ends of a belt together to form a conveyor belt is to cut the belt to a length longer than the required length of the conveyor belt so as to have overlapping ends, to cut the ends at an angle, say 60° with respect to the length of the belt, to strip away the facing layers of belt material at the overlapping ends of the belt, and to fasten the overlapping ends of the belt together by adhesive, by vulcanization, or by mechanical means, or by a combination of these connecting features.

One method of removing a layer of belt material from a conveyor belt is to form a cut in the layer of material across the length of the belt at a predetermined distance from the end of the belt, and if the belt is wide enough, to form one or more cuts along the length of the belt between the cross cut and the end of the belt. The strips formed by the cuts in the layer of belt material then can be peeled away from the other layers of belt material; however, the peeling away of the strip material is usually done by hand, and the workmen must grip and pull the strips of material while simultaneously cutting the adhesive or bond between the layers of material with a knife or other sharp instrument. Since the layers of belt material are usually securely bonded together so that the belt will last a long time when in use, the task of stripping the outer layers at the ends of a belt is onerous and time consuming.

SUMMARY OF THE INVENTION

Briefly described, the present invention comprises a portable conveyor belt stripper that includes a portable framework, a belt clamp for holding the end of a belt to be stripped, and a motor driven winch mounted on the framework. The winch is movable with respect to the clamp so that it can be moved into alignment with and its cable connected to a strip at the end of the conveyor belt. The winch functions to pull the strip from the conveyor belt along a direction parallel to the length of the conveyor belt, without having to reposition the conveyor belt in the clamp. A battery and battery recharger are also carried by the portable framework and function to drive the winch motor.

Thus, it is an object of the present invention to provide a portable belt stripper that expediently removes strips of material from the end of a laminated belt for the purpose of splicing the ends of a length of belt material together to form a closed loop conveyor belt.

Other objects, features and advantages of the present invention will become apparent upon reading the following specification, when taken in conjunction with the accompanying drawing.

BRIEF DESCRIPTION OF THE DRAWING

FIG. 1 is a perspective view of the conveyor belt stripper, showing the clamp in its operative position and the end of a belt held in the clamp.

FIG. 2 is a perspective view of the end of a length of belt material and illustrates the way the cuts are formed in the outer layer of material to form the strips that are to be removed from the ends of the belt.

FIG. 3 is a side schematic illustration of the end of a length of belt material and the cable clamp attached to the strip being stripped away from the belt.

FIG. 4 is a side cross sectional view of the splice formed in a completed closed loop conveyor belt.

DESCRIPTION OF A PREFERRED EMBODIMENT

Referring now in more detail to the drawing, in which like numerals indicate like parts throughout the several views, FIG. 1 illustrates a portable conveyor belt stripper 10 that includes a portable framework 11 having support legs 12 mounted on casters 13. Support legs 12 diverge outwardly and downwardly from the main portion of the framework to provide maximum stability for the framework. The side sections 14 and 15 of the framework each include rectilinear spaced-apart parallel upright support members 16 and 17, and 18 and 19, and lower cross legs 20 and 21. Upper cross legs 22 and 23 are rigidly connected to the upper ends of upright support members 16 and 17, and 18 and 19, and extend beyond the upright support members. Upper horizontal frame members 24 and 25 extend across the framework and are connected at their ends to upper cross legs 22 and 23. Cross braces 26 and 27 are each connected at their ends to upper frame members 24 and 25. Trays 28 and 29 are sized and shaped in accordance with the spaces defined between the upper frame members. Tray 28 functions as a support for a battery 30, and tray 29 functions as a utility tray for receiving tools, spare parts, etc. A battery recharger 31 is rigidly connected to the upper frame members for the purpose of recharging battery 30, when necessary.

A pair of spaced-apart parallel braces or guide bars 33 and 34 are rigidly connected at their ends to the side sections 14 and 15 of framework 11. These spaced parallel braces 33 and 34 function as winch track means, as will be described in more detail hereinafter.

Clamp assembly 35 is connected to framework 11 by outrigger arms 36 and 37. Each outrigger arm 36 and 37 is pivotally connected by a pivot pin 38 to a lower cross leg 20 and 21, and each cross leg and outrigger arm is provided with alignable openings for receiving a locking pin 39, which functions as a locking means for locking the clamp assembly 35 in its operative position, as illustrated. The outrigger arms 36 and 37 can be pivoted about their pivot pin 38 to an upright attitude (not shown). Brackets 40 and 41 project upwardly from lower cross legs 20 and 21, and each of the brackets define an opening therethrough which is alignable with the locking pin opening in the outrigger arm. Thus, when the outrigger arms 36 and 37 are pivoted to an upwardly extending attitude, the locking pins 39 can be inserted through the openings in the outrigger arms and the openings in the brackets 40 and 41 to lock the outrigger arms in their up or storage positions.

Lower rectilinear clamping bar 42 is rigidly joined at its ends to the distal ends of outrigger arms 36 and 37. Upper rectilinear clamping bar 43 is positioned above and substantially parallel to lower bar 42. Positioning rods 44 and 45 extend upwardly from the ends of lower bar 42, coil compression springs 46 and 47 surround the positioning rods, and the upper clamping bar 43 has openings through its ends and its openings are inserted over the positioning rods 44 and 45. A cap 48 and 49 is positioned over the upper end of each positioning rod. Springs 46 and 47 tend to urge the upper clamping bar 43 away from the lower clamping bar 42.

Clamp elements 50 and 51 surround bars 42 and 43. Clamp elements 50 and 51 are formed from a closed length of metal strap material with a rectangular space defined therein, and a tightening screw 52 and 53 extends through the end of each clamp element. When the tightening screws 52 and 53 are rotated, they are moved inwardly or outwardly to close or open the space 54 between clamping bars 42 and 43. Coil compression springs 46 and 47 tend to urge the clamping bar 43 upwardly into engagement with the inner ends of the tightening screws. Lower clamping bar 42 and upper clamping bar 43 together with clamp elements 50 and 51 thus function as a belt clamp member.

Roller 56 is positioned in alignment with the plane of the outrigger arms 36 and 37, beyond rectilinear bar 42. Roller 56 is mounted on the outrigger arms 36 and 37 by brackets 57 and 58.

Caster wheels and wheel supports 70 and 71 are attached to the clamp member 35 at the distal ends of outrigger arms 36 and 37 and function as support means to maintain the clamp assembly 35 at a level approximately even with the level of the spaced parallel braces 33 and 34. Locking pin 39 and its aligned apertures in outrigger arms 36 and 37 and in lower cross legs 20 and 21 also function to lock clamp member 35 at this elevation.

Winch 58 is mounted on framework 11. The winch comprises a reel 59 having a cable 60 wound thereon, and a gripping element 61 attached to the free end of the cable. A series of reduction gears 62 are mounted on winch housing 63 and friction clutch 62a is a part of the reduction gear assembly and allows free rotation of reel 59 when it is desired to extend the free end cable 60 away from reel 59. Electric motor 64 is also mounted on the housing 63 and is arranged to drive the reel 59 through the reduction gears 62. Housing 63 is rigidly connected to slide block 65. Slide block 65 is formed with a width and depth approximately equal to the space between spaced parallel braces 33 and 34. Retaining strap 66 is rigidly connected to the bottom surface of slide block 65 and extends beyond the side edges of the side block beneath parallel braces 33 and 34. The rotational axis of reel 59 is parallel to the parallel braces 33 and 34. This arrangement allows winch 58 to slide along the length of the braces 33 and 34, thus causing the braces 33 and 34 to function as a winch track means. Thus, the winch 58 functions as a winch means movable along the winch track means to be alignable with the length of a belt 68 held in clamp assembly 35.

An inverted U-shaped guard 69 is rigidly connected to the housing 63 and is movable with the housing and winch 58 along the length of the guide bars 33 and 34. Guard 69 functions to keep the cable 60 and its gripper 61 from recoiling against the other elements of winch 58, so that the winch will not be damaged.

The actuating switch (not shown) for motor 61 is spring loaded to its off position, so that the operator's hand must be engaged with the switch in order to have the winch 58 function. The motor, its switch, and battery 30 are electrically connected together so that motor 64 functions as a portion of a power means for operating winch 58. Also, battery recharger 31 is available for recharging battery 30, as necessary, and therefore functions as a portion of the power means that operates winch 58.

As is illustrated in FIG. 2, the belt 68 which is to have its ends stripped, overlapped and spliced to form an endless loop conveyor belt has its outer layer cut at 73 at an angle of approximately 60° across the length of the belt. Longitudinal cuts 74 are also formed in the outer layer of material from the cross cut 73 to the end 75 of the belt. The strips or sections 76 formed by cuts 73 and 74 are then stripped or peeled away from the inner layer of belt material. The gripping device 61 (FIG. 3) grasps the end of the strip adjacent the cross cut 73 and pulls the strip away from the cross cut. When both ends of the length of belt material 68 have its opposite surface layers stripped, the stripped ends are placed in facing relationship in the manner illustrated in FIG. 4 and the ends of the belt are bonded together by adhesive, vulcanizing, or by mechanical means, or by a combination of these means, as illustrated in FIG. 4.

During the stripping operation, the operator can reposition the winch 58 as he pulls the strips 76 from the end of the belt 68, so that the cable 60 is approximately aligned with the length of the belt and the strip which is being pulled from the belt will be pulled lengthwise from the belt. This keeps the belt material from being pulled to the side and possibly stretched out of shape during the stripping function. The belt does not have to be repositioned in the clamp assembly 35 during the stripping procedure.

While this invention has been described in detail with particular reference to preferred embodiments thereof, it will be understood that variations and modifications can be effected within the spirit and scope of the invention as described hereinbefore and as defined in the appended claims.

I claim:

1. Apparatus for stripping a layer of material from a conveyor belt or the like comprising a framework including a winch track means for supporting a winch means and allowing a winch means to move along a rectilinear path, a pair of overlying rectilinear clamping bars positioned approximately parallel to the path of said winch track means and movable toward and away from each other and displaced from said winch track means for rigidly clamping the end portion of a flat belt of the like uniformly across its length with the length of the belt extending normal to the length of said winch track means, winch means including a reel and cable means mounted on said winch track means, said winch means being freely movable along the length of said winch track means for repositioning the free end of the cable with respect to said clamping bars and for movement into alignment with the length of the flat belt in the clamping bars, said cable means extending freely outwardly from said reel toward said clamping bars, and power means connected to said winch means for supplying power to said winch means, whereby a conveyor belt or the like which is to have a layer of material thereof stripped therefrom is clamped in the clamping bars with its end portion extending from the clamp member toward the winch track means and with its length extending normal to the winch track means, the winch means moved along the winch track means into alignment with the portion of the material of the conveyor belt which is to be stripped from the conveyor belt and the cable is connected to the portion of the material to be stripped from the conveyor belt, and the winch is operated to strip the portion of the material from the conveyor belt in a direction extending along the length of the conveyor belt.

2. The apparatus of claim 1 and wherein said winch track means comprises a pair of spaced parallel guide bars and said winch means is slidable along the length of said guide bars.

3. Apparatus for removing elongated strips of layers of material from a multiple ply conveyor belt or the like comprising a portable framework including a horizontal winch track means for supporting a winch means and allowing a winch means to move along a horizontal rectilinear path, a pair of overlying rectilinear horizontal clamping bars positioned approximately parallel to the path of said winch track means and movable toward and away from each other and displaced from said winch track means for rigidly clamping the end portion of a flat belt or the like uniformly across its length with the length of the belt extending normal to the length of said winch track means, said clamp means being pivotal with respect to said winch track means between a storage position approximately above said winch track means and a position approximately level with said winch track means, winch means including a reel and cable means mounted on said winch track means, said winch means being freely movable along the length of said winch track means for repositioning the free end of the cable with respect to said clamping bars and for movement into alignment with the length of the flat belt in the clamping bars, said cable means extending freely outwardly from said reel toward said clamping bars, and power means connected to said winch means for supplying power to said winch means, whereby said clamp means is positioned level with respect to said winch track means, a conveyor belt or the like which is to have strips of a layer of a material thereof removed therefrom is clamped in the clamping bars with its end portion extending from the clamp member toward the winch track means and with its length extending normal to the winch track means, the winch means moved along the winch track means into alignment with a strip of the material of the conveyor belt which is to be removed from the conveyor belt and the cable is connected to the strip of the material to be removed from the conveyor belt, and the winch is operated to pull the portion of the material from the conveyor belt in a direction extending along the length of the conveyor belt.

4. The apparatus of claim 3 and wherein said power means comprises a battery and battery recharging means mounted on said framework.

* * * * *